Feb. 24, 1942.   M. KATCHER   2,274,420
KNUCKLE JOINT
Filed Feb. 12, 1941
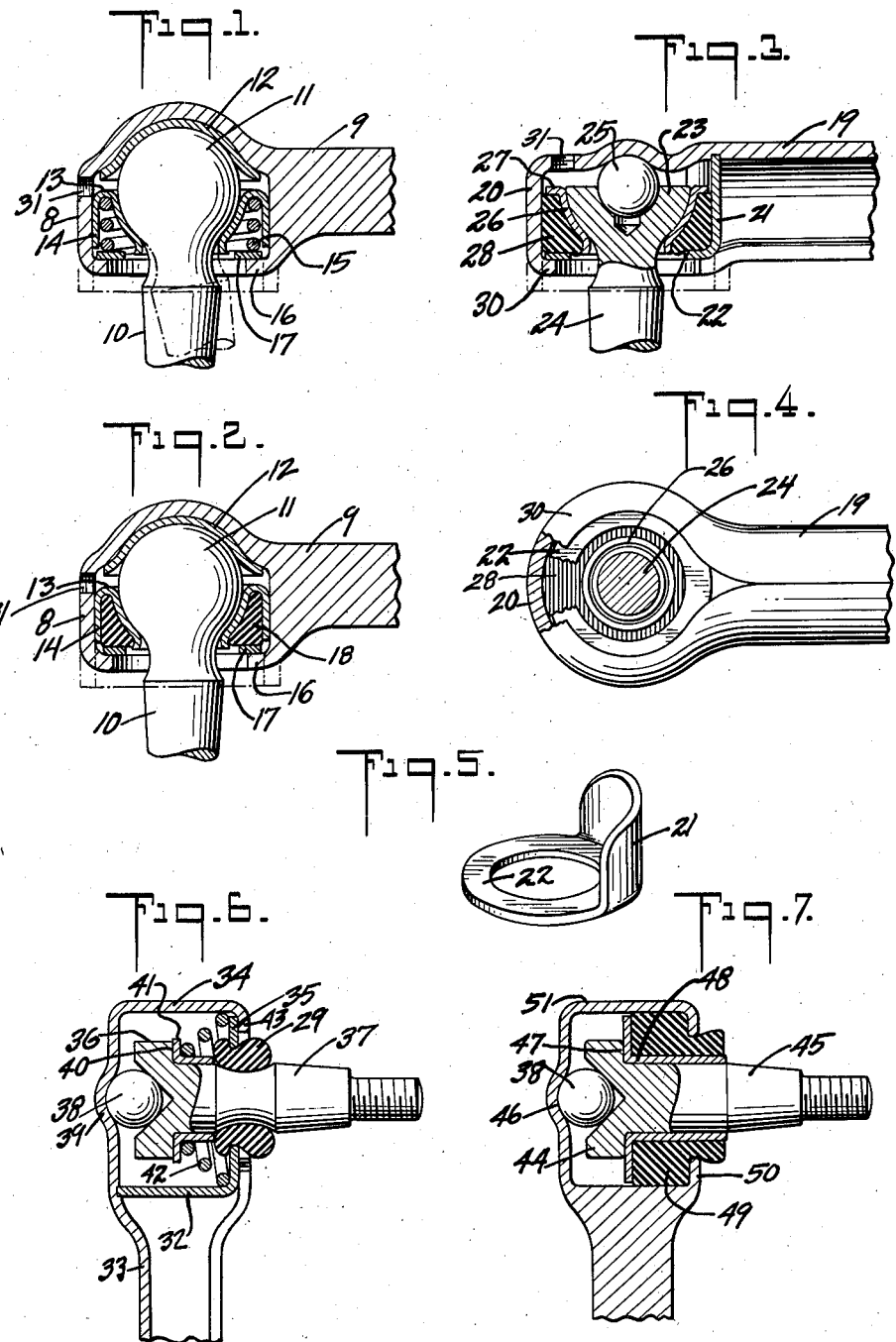
INVENTOR
MORRIS KATCHER.
BY
Emanuel Scheyer
ATTORNEY Patented Feb. 24, 1942

2,274,420

UNITED STATES PATENT OFFICE 2,274,420

KNUCKLE JOINT

Morris Katcher, New York, N. Y.

Application February 12, 1941, Serial No. 378,492

16 Claims. (Cl. 287—90)

This invention relates to a joint assembly providing limited universality of movement and is particularly adapted for a steering knuckle joint for use in the tie rod connections of automotive vehicles as well as for a link and studs such as are used in a joint or shock absorber assemblage, said link being commonly referred to as a drag or shock link.

This application is a continuation in part of my application Serial Nos. 234,101 and 281,321, the latter now being Patent No. 2,236,062, dated March 25, 1941.

It is a feature of this invention that the head of the stud is subject to yielding pressure away from the aperture in the housing through which the stud projects. Two types of spring means are used to produce this pressure, one a metallic spring preferably in the form of a helix and the other a packing made of rubber or the like. The housing is filled with lubricant. In some forms, the lubricant is sealed in the housing by packing. Synthetic rubber is better able to withstand the common lubricants in use than natural rubber, so I wish it to be understood that the term rubber as used herein is intended to include synthetic material having the resilient characteristics of rubber.

Where the joint is used with a tie rod end the angular movement is large and the vibration small. With a shock link the angular movement is small but greater vibration occurs. Accordingly those forms in which rubber or the like is used for spring means are well adapted for shock links, said latter spring means, while not so good for angular motion, producing quietness by absorbing the vibration.

Other objects and advantages will become apparent upon further study of the description and drawing, in which—

Fig. 1 is a section through one form of the knuckle in which there is a solid shank and a coiled spring for dampening.

Fig. 2 is a section through a second form of the knuckle in which there is a solid shank and a rubber means for dampening.

Fig. 3 is a section through a third form of the knuckle in which there is a hollow shank and a rubber means for dampening.

Fig. 4 is a bottom view of the knuckle of Fig. 3, a portion of the housing and inset being broken away.

Fig. 5 is a perspective view of the inset used in the knuckles of Figs. 3 and 4 shown by itself.

Fig. 6 is a section through a fourth form of the knuckle in which there is a hollow shank, a coiled spring and a rubber grommet serving as a dust shield between the stud and the edges of the opening in the inset, and Fig. 7 is a section through a fifth form of the knuckle in which there is a solid shank and a rubber dampening means serving also as a dust shield.

Referring to Fig. 1, a housing 8 is provided at the end of a shank 9. Stud 10 is provided with a spherical head 11 which is set inside of housing 8. An anti-friction liner 12 is set between the top of head 11 and the inside face of the upper wall of housing 8. Surrounding the lower portion of head 11 is a bushing 13, preferably of anti-friction metal. The portion of bushing 13 in contact with head 11 is of spherical form to fit the head. Projecting downward from the upper portion of bushing 13, is a cylindrical flange 14. An annular channel is formed between the inside portion of bushing 13 and flange 14 in which is located spiral spring 15. Between the bottom of spring 15 and lip 16 of housing 8 is ring-shaped inset 17. Flange 14 is slidably mounted in housing 8. Before head 11, bushing 13, spring 15 and inset 17 were inserted in the housing, lip 16 was in the position shown by the dot and dash lines. Once these parts are inserted, lip 16 is peened over as shown by the solid lines. The dot and dash lines for stud 10 show it in displaced position, such as may occur in use of the joint. Spring 15 yieldingly presses bushing 13 upward against head 11 forcing the latter against liner 12. This assembly permits universal rotation of stud 10 with respect to housing 8 and shank 9, the spring coacting with the rest of the assembly to dampen the motion.

In Fig. 2, all the parts are the same as just described for the knuckle of Fig. 1 except that in place of spring 15 is a resilient packing or spring means 18 of rubber or the like which substantially fills the annular channel between the inside portion of bushing 13 and flange 14 and reacts against inset 17.

In the joint of Fig. 3, shank 19 is hollow, its interior being separated from the interior of housing 20 by tail 21 of inset 22. Head 23 of stud 24 is substantially hemispherical, its upper surface being flat except for the recess in which ball 25 is set. Surrounding the lower portion of head 23 is a bushing 26 preferably of anti-friction metal. The portion of bushing 26 contacting head 23 is of spherical form to fit the head. A substantially radial flange 27 is at the upper portion of bushing 26. A resilient packing 28 is set in between housing 20, bushing 26 and inset 22. Before assembling, lip 30 is in its dot and dash position which enables the parts to be inserted into housing 20. Lip 30 is then peened over to the position shown by the solid lines pressing up the ring-shaped base of inset 22 against packing 28. Tail 21 is just of sufficient width to close off the interior of shank 19 from the interior of housing 20, inset 22 with its tail 21 being clamped in position by the peening over of lip 30. In Figs. 1, 2 and 3 an oil hole 31 is provided for introducing lubricant into the housing. A screw or a grease fitting, not shown, can be screwed into the hole. In Fig. 3, tail 21 prevents the lubricant from escaping into the interior of shank 19.

In the joint of Fig. 6, tail 32 of inset 35 serves, as in Fig. 3, to separate the interior of shank 33 from the interior of housing 34. Head 36 of stud 37 is provided with a conical recess in which ball 38 is mounted, said ball being held between the head and the housing wall at depression 39. Head 36 is formed with a shoulder 40. A sleeve or bushing 41 is loosely mounted on head 36 and butts against shoulder 40, being held against the latter by one end of helical spring 42. The other end of spring 42 reacts against inset 35, the latter being similar to that shown in Fig. 5. A grommet 29 of rubber or the like is inserted between stud 37 and inset 35. The stud and its assembly is maintained in housing 34 by lip 43. Lubricant in housing 34 is prevented by tail 32 from entering the interior of shank 33.

In Fig. 7, head 44 of stud 45 is provided with a conical recess in which a ball 38 is mounted, said ball being held between the head and the housing wall at depression 46. Head 44 is formed with a shoulder 47. A sleeve or bushing 48 is loosely mounted on head 44 and butts against shoulder 47, being held against the latter by one end of resilient packing or spring means 49 of rubber or the like. Toward its other end, packing 49 abuts against lip 50 of housing 51. Said other end of packing 49 protrudes out of housing 51, being pinched between lip 50 and sleeve or bushing 48.

I claim:

1. A joint comprising a housing, having an aperture, a member having a head in the housing and a shaft extending out of the housing through said aperture, and dampening means located inside of the housing, for mounting the head of the member in the housing, said means yieldingly urging the head of the member inward of the housing away from said aperture and permitting a limited universal motion between the member and the housing said head exerting pressure against the inside of the housing opposite said aperture.

2. A joint comprising a housing having an aperture, a member having a head in the housing and a shaft extending out of the housing through said aperture, dampening means for mounting the head of the member in the housing, said means yieldingly urging the head of the member inward of the housing away from said aperture and permitting a limited universal motion between the member and the housing, said head exerting pressure against the inside of the housing opposite said aperture, and means having an opening therein through which said shaft extends, said latter means being located in the housing adjacent the aperture, and partially closing off said aperture, for maintaining the member and dampening means in the housing.

3. A joint comprising a housing having an aperture, a member having a head in the housing and a shaft extending out of the housing through said aperture, dampening means located inside of the housing for mounting the head of the member in the housing with a limited universal motion between the member and the housing, and an inset set over said shaft in the housing at said aperture, the dampening means reacting at one portion against the inset and at another portion against said head urging the latter into the housing away from said aperture to exert pressure against the inside of the housing opposite said aperture, said housing at the aperture being formed with a flange overlapping the inset, retaining thereby the inset, the head and the dampening means in the housing.

4. A joint comprising a housing having an aperture at one side and a hollow shank extending from the housing at another side with an opening between the interior of the housing and the interior of the shank, a member having a head and a shaft, dampening means for mounting the head of the member in the housing, said means permitting a limited universal motion between the member and the housing, said member and means being insertible into their positions in the housing through said aperture, and an inset placed in the housing at said aperture, said inset having a tail of a width substantially equal to that of the opening, being set at the opening and separating the interior of the housing from the interior of the shank, the shaft of the member extending out through said aperture and through an opening provided in the inset.

5. A joint comprising a housing having an aperture, a member extending through said aperture having a head in the housing with a spherical bearing surface on the portion of the head toward said aperture, a bushing having a spherical inner bearing surface engaging the bearing surface of the head only on the side toward the aperture, and resilient means engaging the bushing constantly urging it away from said aperture and the bearing surfaces into bearing relationship with each other.

6. A joint comprising a housing having an aperture, a member extending through said aperture having a head in the housing, said head having a portion at a place inward from the aperture of greater width than its portion at the aperture, a bushing having an inner bearing surface engaging a complementary bearing surface on the head, the engaging of said bearing surfaces occurring only between the wider portion of the head and the aperture, and resilient means compressed between the portion of the housing adjacent said aperture and the bushing constantly urging the latter away from the aperture and the bearing surfaces into bearing relationship with each other.

7. A joint comprising a housing having an aperture, a member extending through said aperture having a head in the housing, said head having a portion at a place inward from the aperture of greater width than its portion at the aperture, and resilient means compressed between said wider portion and the portion of the housing adjacent said aperture constantly urging the head away from said aperture, said means extending inward of the housing only as far substantially as the wider portion of the head.

8. A joint comprising a housing having an aperture, a member extending through said aperture having a head in the housing, said head having a portion at a place inward from the aperture of greater width than its portion at the aperture, an inset in the housing adjacent the aperture, said inset having an opening in it through which the member extends, said opening being of less diameter than that of the aperture, and resilient means compressed between said wider portion and the inset constantly urging the head away from said aperture.

9. A joint comprising a housing having an aperture, a member extending through said aperture having a head in the housing, said head having a portion at a place inward from the aperture of greater width than its portion at the aperture, a bushing having an inner bearing surface engaging a complementary bearing surface on the head, the engaging of said bearing surfaces occurring between the wider portion of the head and the aperture, and a packing of rubber or the like compressed between the portion of the housing adjacent said aperture and the bushing, constantly urging the latter away from the aperture and the bearing surfaces into bearing relationship with each other, said packing extending into the housing from the aperture substantially only to said wider portion.

10. A joint comprising a housing having an aperture, a member extending through said aperture having a head in the housing, said head having a portion at a place inward from the aperture of greater width than its portion at the aperture, a bushing having an inner bearing surface engaging a complementary bearing surface on the head, the engaging of said bearing surfaces occurring between the wider portion of the head and the aperture and a coiled spring engaging the bushing substantially at the wider portion of the head, said spring being compressed between the portion of the housing adjacent said aperture and the bushing, constantly urging the latter away from the aperture and the bearing surfaces into bearing relationship with each other.

11. A joint comprising a housing having an aperture, a member extending through said aperture having a head in the housing, said head having a portion at a place inward from the aperture of greater width than its portion at the aperture, a bushing having an inner bearing surface engaging a complementary bearing surface on the head, the engaging of said surfaces occurring between the wider portion of the head and the aperture, said bushing having a radially outward extending flange, and resilient means compressed between the portion of the housing adjacent said aperture and the flange constantly urging the latter away from the aperture and the bearing surfaces into bearing relationship with each other.

12. A joint comprising a housing having an aperture, a member extending through said aperture having a head in the housing, said head having a portion at a place inward from the aperture of greater width than its portion at the aperture, a bushing having a body portion with an inner bearing surface engaging a complementary bearing surface on the head, the engaging of said surfaces occurring between the wider portion of the head and the aperture, said bushing having a flange extending radially from it substantially opposite the wider portion of the head, said flange extending from its radial portion back toward the aperture in spaced relation to said body portion, and resilient means in the space between the flange and the body portion, compressed between the portion of the housing adjacent said aperture and the bushing, constantly urging the latter away from the aperture and the bearing surfaces into bearing relationship with each other.

13. A joint as claimed in claim 12 in which the backwardly extending portion of the flange has a cylindrical outer surface and the housing opposite said portion of the flange has a cylindrical inner surface, said surfaces being in sliding contact.

14. A joint as claimed in claim 12 in which the resilient means in the space between the flange and body portion of the bushing is a packing of rubber or the like.

15. A joint as claimed in claim 12 in which the resilient means in the space between the flange and the body portion of the bushing is a coiled spring.

16. A joint comprising a housing having an aperture, a member extending through said aperture having a head in the housing, said head having its most inward portion from the aperture of abruptly greater width than its portion at the aperture, and resilient means in the housing compressed between said wider portion and the portion of the housing adjacent said aperture constantly urging the head away from said aperture.

MORRIS KATCHER.